United States Patent
Ghidoni et al.

(10) Patent No.: US 9,115,253 B2
(45) Date of Patent: Aug. 25, 2015

(54) PROCESS FOR THE PREPARATION OF EXPANDABLE VINYL AROMATIC POLYMERS WITH A REDUCED THERMAL CONDUCTIVITY BY POLYMERIZATION IN SUSPENSION

(75) Inventors: Dario Ghidoni, Gonzaga (IT); Alessandra Simonelli, Mantova (IT); Antonio Ponticiello, Mozzecane (IT); Andrea La Piccirella, Modena (IT)

(73) Assignee: POLIMERI EUROPA S.p.A., San Donato Milanese (IT)

( * ) Notice: Subject to any disclaimer, the term of this patent is extended or adjusted under 35 U.S.C. 154(b) by 540 days.

(21) Appl. No.: 13/393,843

(22) PCT Filed: Aug. 6, 2010

(86) PCT No.: PCT/IB2010/001983
§ 371 (c)(1), (2), (4) Date: Mar. 7, 2012

(87) PCT Pub. No.: WO2011/027196
PCT Pub. Date: Mar. 10, 2011

(65) Prior Publication Data
US 2012/0184636 A1    Jul. 19, 2012

(30) Foreign Application Priority Data
Sep. 7, 2009  (IT) .............. MI2009A1543

(51) Int. Cl.
| C08J 9/16 | (2006.01) |
| C08J 9/00 | (2006.01) |
| C08J 9/04 | (2006.01) |
| C08J 9/20 | (2006.01) |
| C08K 5/02 | (2006.01) |
| C08K 5/20 | (2006.01) |

(52) U.S. Cl.
CPC .............. *C08J 9/0019* (2013.01); *C08J 9/0028* (2013.01); *C08J 9/20* (2013.01); *C08K 5/02* (2013.01); *C08K 5/20* (2013.01); *C08J 2325/02* (2013.01)

(58) Field of Classification Search
USPC .................. 521/56, 59, 60, 94, 128
See application file for complete search history.

(56) References Cited

U.S. PATENT DOCUMENTS

| 4,393,147 A | 7/1983 | Schwarz |
| 4,692,471 A * | 9/1987 | Fudge .............................. 521/59 |
| 5,935,645 A | 8/1999 | Anfuso et al. |
| 6,147,130 A | 11/2000 | Anfuso et al. |
| 7,279,504 B2 | 10/2007 | Ghidoni et al. |
| 2005/0222280 A1 | 10/2005 | Lanfredi et al. |
| 2005/0239913 A1 | 10/2005 | Casalini et al. |
| 2006/0058407 A1 | 3/2006 | Ghidoni et al. |
| 2006/0241195 A1 | 10/2006 | Casalini et al. |
| 2009/0030096 A1 | 1/2009 | Lee et al. |
| 2010/0148110 A1 | 6/2010 | Casalini et al. |
| 2011/0046249 A1 | 2/2011 | Ponticiello et al. |
| 2011/0284793 A1 | 11/2011 | Ponticiello et al. |
| 2012/0091388 A1 | 4/2012 | Felisari et al. |

FOREIGN PATENT DOCUMENTS

| EP | 2 025 691 | 2/2009 |
| JP | 2002-194130 | 7/2002 |
| WO | 02 12377 | 2/2002 |
| WO | 2008 141767 | 11/2008 |

OTHER PUBLICATIONS

International Search Report issued on Oct. 20, 2010 in PCT/IB2010/001983 filed on Aug. 6, 2010.

* cited by examiner

*Primary Examiner* — Kara Boyle
(74) *Attorney, Agent, or Firm* — Oblon, McClelland, Maier & Neustadt, L.L.P.

(57) ABSTRACT

Process for the preparation of beads of expandable vinyl aromatic polymers by means of polymerization in aqueous suspension, which comprises polymerizing at least one vinyl aromatic monomer in aqueous suspension in the presence of a peroxide initiator system, active at a temperature higher than 800 C, an expanding agent, and in the presence of: —an amide having the general formula $R_1CONHCH_2$—$CH_2NHCOR_2$ (I) a flame retardant system comprising a brominated additive with a bromine content higher than 30% by weight.

16 Claims, No Drawings

PROCESS FOR THE PREPARATION OF EXPANDABLE VINYL AROMATIC POLYMERS WITH A REDUCED THERMAL CONDUCTIVITY BY POLYMERIZATION IN SUSPENSION

The present invention relates to a process for the preparation of expandable vinyl aromatic polymers, with a reduced thermal conductivity, by polymerization in suspension.

More specifically, the present invention relates to a process for the preparation of expandable vinyl aromatic polymers by polymerization in suspension and the expandable compositions based on vinyl aromatic polymers thus obtained, capable of giving expanded articles with a low density and improved insulating capacity.

Even more specifically, the present invention also relates to expanded articles of vinyl aromatic polymers having a density ranging from 5 to 50 g/l, preferably from 10 to 25 g/l, having excellent thermal insulation properties, expressed by a thermal conductivity ranging from 25 to 50 mW/mK, preferably from 30 to 45 mW/mK, which is generally, on an average, even more 10% lower than that of equivalent expanded articles obtained from conventional materials currently on the market, for example EXTIR A-5000 of Polimeri Europa S.p.A. These expanded articles are stable to deformations induced by exposure to solar radiations.

All the conditions mentioned in the description should be considered preferred conditions, even if not expressly indicated.

Expandable vinyl aromatic polymers and among these, in particular, expandable polystyrene (EPS), are known products, long used for preparing expanded articles which can be adopted in various applicative areas, among which, one of the most important is thermal insulation.

These expanded products are obtained by first swelling the polymer beads, in a closed environment, impregnated with an expandable fluid, for example an aliphatic hydrocarbon such as pentane or hexane, and then molding the swollen particles contained inside a mould, by means of the contemporaneous effect of pressure and temperature. The swelling of the particles is generally effected with vapour, or another gas, maintained at a temperature slightly higher than the glass transition temperature (Tg) of the polymer.

As already mentioned, a particular applicative field of expanded polystyrene is that of thermal insulation in the building industry where it is generally used in the form of flat sheets. The flat expanded polystyrene sheets are normally used with a density of about 25-30 g/l as the thermal conductivity of the polymer has a minimum at these values. It is not advantageous to fall below this density, even if it is technically possible, as it causes a drastic increase in the thermal conductivity of the sheet which must be compensated by an increase in its thickness.

In order to overcome this drawback, it has been suggested, as described for example in published US patent US2008/0300328, to add small quantities (0.01-0.0001% by weight) of low-molecular-weight polyethylene wax to the polymerization formulation. The thermal conductivity is in fact lowered, reaching for example 37.4 mW/mk at 14 g/l whereas a reference EPS has a conductivity of about 39-40 mW/mk at the same density. This result is obtained thanks to the high cell diameter (about 230-240 µm) of the EPS product expanded at 14 g/l, a diameter which, however, jeopardizes the mechanical properties of the end-product. The compression stress, in fact, at 10% deformation is reduced from 75 KPa of a standard EPS to 55 KPa.

Filling the polymer with athermanous materials such as graphite, carbon black or aluminium, is also known. Athermanous materials are in fact capable of interacting with the radioactive thermal flow, reducing its transmission and consequently increasing the insulation of the expanded materials in which they are contained. In this way, it is possible to prepare thermo-insulating articles with a density even lower than 20 g/l, with a high insulating capacity, without having insulating reductions to be compensated with increases in thickness.

The thermo-insulating articles in expanded polystyrene filled with athermanous materials, in particular graphite and/or carbon black, have the disadvantage of become easily deformed when exposed to solar irradiation, also for short periods of time, as the expanded particles of which they consist tend to collapse.

The Applicant has now found that it is possible to prepare a flame-retardant expandable polystyrene, without the above drawbacks, i.e. capable of giving articles (e.g. sheets) with a thermal conductivity, for example, of about 34-36 mW/mk at 17 g/l and with a compression stress, at 10% of deformation, of 75 KPa at 14 g/l, and therefore almost identical to that of a reference EPS, thanks to an optimum cell diameter of about 120-130 microns. The thermal conductivity of the sheets is substantially identical to that of EPS modified with athermanous materials. Possible deficits can be compensated by a moderate increase in the thickness.

This result can be considered extremely surprising, due to the fact that, as is known to experts in the field, the flame-retardant systems generally based on bromine, currently used for making EPS resins flame-retardant, tend to englobe water of the suspending system in the beads produced. As is known, water has a nucleating capacity and contributes to forming expanded articles, i.e. sheets, with a cellular structure having small-sized cells and consequently the articles have a reduced thermal insulation capacity. The present invention, on the other hand, has overturned this tendency. Furthermore, the sheets obtained can remain exposed to solar radiation without undergoing deformation.

An object of the present invention therefore relates to a process for the preparation of beads of flame-retardant expandable vinyl aromatic polymers, capable of producing expanded articles with a reduced thermal conductivity, by means of polymerization in aqueous suspension which comprises polymerizing at least one vinyl aromatic monomer, for example styrene or a mixture of styrene containing up to 25% by weight of α-methylstyrene, in aqueous suspension in the presence of a peroxide initiator system, active at a temperature higher than 80° C., an expanding agent, added before, during or after the polymerization, and in the presence of:
an amide having the general formula (I)

$$R_1CONHCH_2\text{—}CH_2NHCOR_2 \quad (I)$$

wherein $R_1$ and $R_2$, the same or different, represent an (iso) alkyl radical $CH_3(CH_2)_n$ with n ranging from 10 to 20, preferably from 16 to 18, a $C_6$-$C_{12}$ aromatic or $C_7$-$C_{25}$ alkylaromatic radical; and
a flame-retardant system comprising a brominated additive with a bromine content higher than 30% by weight.

According to the present invention, in the polymerization in suspension, the amide having general formula (I) is added in a quantity ranging from 5 to 5,000 ppm, with respect to the weight of the monomeric base, preferably 10 to 500 ppm. The preferred product is N,N'ethylene-bis-stearamide.

Adding amides in the polymerization of vinyl aromatic monomers to reduce the formation of clots is known, for example from U.S. Pat. No. 3,339,097. These polymers however do not contain brominated additives and the addition is problematic as it must be effected with a certain conversion of the monomer to polymer i.e. from 16 to 95% as premature additions lead to emulsions with water, whereas delayed additions jeopardize the effect of the amide.

Adding amides, again in the polymerization of vinyl aromatic monomers without flame-retardant additives to obtain small cells, is also known, for example from U.S. Pat. No. 3,960,787.

Surprisingly, the addition of amides to flame-retardant polymers, on the other hand, produces wide cells and therefore an improved insulating capacity, an effect which is exactly opposite to that disclosed in the patent of the known art.

The term "vinyl aromatic monomer", as used in the present description and claims, essentially means a product corresponding to the following general formula (II):

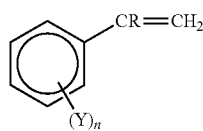

wherein R is a hydrogen or a methyl group, n is zero or an integer ranging from 1 to 5 and Y is a halogen, such as chlorine or bromine, or an alkyl or alkoxyl radical having 1 to 4 carbon atoms.

Examples of vinyl aromatic monomers having the general formula identified above, are: styrene, α-methylstyrene, para-methylstyrene, ethylstyrene, butylstyrene, dimethylstyrene, mono-, tri-, tetra- and penta-chlorostyrene, bromo-styrene, methoxystyrene, acetoxystyrene, etc. Preferred vinyl aromatic monomers are styrene, α-methylstyrene and para-methylstyrene.

The vinyl aromatic monomers having general formula (II) can be used alone or in a mixture of up to 50% by weight with other co-polymerizable monomers. Examples of said monomers are (meth)acrylic acid, $C_1$-$C_4$ alkyl esters of (meth) acrylic acid such as methyl acrylate, methyl methacrylate, ethyl acrylate, ethyl methacrylate, isopropyl acrylate, butyl acrylate, amides and nitriles of (meth)acrylic acid such as acrylamide, methacrylamide, acrylonitrile, methacrylonitrile, butadiene, ethylene, divinyl benzene, maleic anhydride, etc. Preferred co-polymerizable monomers are acrylonitrile and methyl methacrylate.

Any expanding agent capable of being englobed in the polymeric vinyl aromatic matrix can be used in the process, object of the present invention. Typical examples of expanding agents are aliphatic hydrocarbons, Freon, carbon dioxide, alcohols such as ethyl alcohol, etc.

The expanding agents can be selected from aliphatic or cyclo-aliphatic hydrocarbons containing 3 to 6 carbon atoms such as n-pentane, iso-pentane, cyclopentane or mixtures thereof; halogenated derivatives of aliphatic hydrocarbons containing 1 to 3 carbon atoms, such as, for example, dichlorodifluoromethane, 1,2,2-trifluoro-ethane, 1,1,2-trifluoroethane; carbon dioxide; and ethyl alcohol.

The expanding agents are added in a quantity ranging from 1 to 10% by weight, with respect to the monomeric base, preferably during the polymerization phase, or subsequently by means of the re-suspension technology. In particular, the latter comprises the phases of:

polymerizing the monomers in aqueous suspension in the presence of additives, for example a flame-retardant system;

separating the beads thus obtained;

re-suspending the beads in water and heating until their spherical form is obtained;

adding the expanding agents to the suspension and keeping the beads in contact with the same until impregnation; and re-separating the beads.

During the process, object of the present invention, conventional additives can be added to the aqueous suspension, such as pigments, stabilizing agents, nucleating agents, flame-retardant systems, antistatic agents, release agents, etc. In particular, a flame-retardant system can be added, containing from 0.1 to 3% by weight, with respect to the monomeric base, preferably from 0.4 to 2.2%, of a self-extinguishing brominated additive containing at least 30% by weight of bromine, preferably from 50 to 90% by weight, and 0 to 1% by weight, with respect to the monomeric base, preferably 0.01 to 0.4%, of a synergic product containing at least one C—C or C—O—O—C thermolabile bond, as described hereunder.

Flame-retardant agents particularly suitable for the present invention are brominated aliphatic, cycloaliphatic, aromatic compounds, for example $C_6$-$C_{18}$, such as hexabromocyclododecane (EBCD), pentabromomonochlorocyclohexane and pentabromophenyl allyl ether, bis-tetrabromobisphenol-A allyl ether, the latter known on the market as "Chemtura BE51", of the company Chemtura, etc. Synergic products which can be used are dicumyl peroxide (DCP), cumene hydroperoxide, 3,4-dimethyl-3,4-diphenyl-hexane, 2,3-dimethyl-2,3-diphenyl butane, 3,6,9-triethyl-3,6,9-trimethyl-1,4,7-triperoxynonane, etc.

The term "beads", as used in the present description and claims, essentially refers to the form of the vinyl aromatic polymer which derives from a preparation process in suspension. This process can alternatively also comprise the dissolution/dispersion of the flame-retardant system, and/or other additive, in the vinyl aromatic monomer, as previously defined, and the suspension in water of the monomeric mixture, followed by polymerization in the presence of possible polymerization additives, known to experts in the field, among which stabilizing agents of the suspension, chain transfer agents, expansion coadjuvants, nucleating agents, plasticizers, etc. The "beads" thus obtained have a substantially spherical form, both before and after expansion.

The beads are prepared by polymerization in aqueous suspension using inorganic salts of phosphoric acid, for example tri-calcium phosphate or magnesium pyrophosphate, as suspending agents. These salts can be added to the polymerization mixture either already finely subdivided or synthesized in situ by reaction, for example, between sodium pyrophosphate and magnesium sulfate.

Said inorganic salts can be assisted in their suspending action by anionic surface-active agents, for example sodium dodecylbenzene sulfonate or their precursors such as sodium metabisulfite, as described in U.S. Pat. No. 3,631,014.

The polymerization can also be carried out in the presence of organic suspending agents such as polyvinylpyrrolidone, polyvinyl alcohol, etc.

In the process in suspension, the polymerization reaction is generally triggered by an initiating system. The initiating system normally comprises two peroxides, the first with a halving time of an hour at 85-95° C. (for example dibenzoyl peroxide) and the other with a halving time of an hour at 110-120° C. (examples are tert-butylperoxy-2-ethylhexanoate and tert-butylperbenzoate).

The vinyl aromatic polymer which is obtained at the end of the polymerization has an average molecular weight Mw ranging from 50,000 to 300,000, preferably from 70,000 to 250,000. In general, more details on procedures for the preparation of expandable vinyl aromatic polymers in aqueous solution or, more generally, polymerization in suspension, can be found in Journal of Macromolecular Science, Review in Macromolecular Chemistry and Physics C31 (263) 215-299 (1991).

To improve the stability of the suspension, it is possible to increase the viscosity of the reagent mixture (vinyl aromatic monomeric base plus possible additives), to be suspended in water, by dissolving vinyl aromatic polymer therein, up to a concentration of 1 to 30% by weight, preferably 5 to 20%, calculated with respect to the monomeric base. The solution can be obtained by dissolving a preformed polymer in the reagent mixture (for example fresh polymer or waste-products from previous polymerizations and/or expansions) or by a mass pre-polymerization of the monomer, or mixture of monomers, until the previously mentioned concentrations are obtained, and subsequently continuing the polymerization in aqueous suspension, possibly in the presence of the remaining additives.

At the end of the polymerization, substantially spherical beads of expandable polymer are obtained, with an average diameter ranging from 0.2 to 2 mm, preferably from 1 to 1.5 mm.

The beads are then discharged from the polymerization reactor and washed, in continuous or batchwise, with non-ionic surface-active agents or, alternatively, with acids, as described in U.S. Pat. No. 5,041,465. The polymer beads can then be treated thermally with hot air ranging from 30 to 60° C.

At the end of the polymerization, the expandable beads obtained are subjected to pre-treatment which is generally applied to conventional expandable compositions and which essentially consists in:
1. covering the beads with a liquid antistatic agent selected from amines, ethoxylated tertiary alkylamines, ethylene oxide/propylene oxide copolymers, etc. Said agent is used to adhere the coating and to facilitate the screening of the beads prepared in suspension;
2. applying the coating to said beads, said coating essentially consisting of a mixture of mono-, di- and tri-esters of glycerine (or other alcohols) with fatty acids, and metal stearates such as zinc and/or magnesium stearate.

A further object of the present invention relates to expandable compositions in vinyl aromatic-based beads capable of providing low-density expanded products and with an improved insulating capacity which comprise:
a. a matrix obtained by polymerizing 50-100% by weight of one or more vinyl aromatic monomers, for example styrene or a mixture of styrene containing up to 25% by weight of α-methylstyrene, and 0-50% by weight of at least one copolymerizable monomer;
b. 1-10% by weight, calculated with respect to the polymeric matrix (a), of an expanding agent;
c. 0.1-3% by weight, preferably 0.4-2.2%, calculated with respect to the polymeric matrix (a), of a self-extinguishing brominated additive;
d. 0-1% by weight, preferably 0.01-0.4%, calculated with respect to the polymeric matrix (a), of a synergic agent (c) containing at least one thermolabile C—O—O—C or C—C bond;
e. 5-5,000 ppm by weight, preferably 10-500 ppm, calculated with respect to the polymeric matrix (a), of an amide having general formula (I),
obtainable with the process in aqueous suspension previously described.

Some illustrative and non-limiting examples are provided hereunder for a better understanding of the present invention and for its embodiment.

EXAMPLE 1

A mixture is charged into a closed and stirred container, consisting of 150 parts by weight of water, 0.2 parts of sodium pyrophosphate, 97 parts of styrene, 3 parts of alpha-methylstyrene, 0.30 parts of dibenzoyl peroxide, 0.25 parts of tert-butylperbenzoate, 0.70 parts of hexabromocyclododecane Saytex HP 900 sold by Albemarle, 0.2 parts of dicumyl peroxide and 0.002 parts of N,N'ethylene-bis-stearamide wax sold by Sogis with the trade-name of Waxo. The mixture is heated under stirring to 90° C.

After about 2 hours at 90° C., 4 parts of a solution of polyvinylpyrrolidone at 10% are added. The mixture is heated to 100° C., still under stirring, for a further 2 hours, 7 parts of a 70/30 mixture of n-pentane and i-pentane are added, the mixture is heated for a further 4 hours to 120° C., it is then cooled to 65° C. in an hour and the reaction container is discharged at a pressure of 4 bar in a stream of water at 10° C. to reach a final temperature of 30° C.

The beads of expandable polymer thus produced are subsequently recovered and washed with demineralized water containing 0.05% of a non-ionic surface-active agent consisting of a fatty alcohol condensed with ethylene oxide and propylene oxide, sold by Huntsman under the trade-name of Empilan 2638. The granules are then dried in a stream of warm air, with the addition of 0.02% of a non-ionic surface-active agent, consisting of a condensate of ethylene oxide and propylene oxide on a glycerine base, sold by Dow (Voranol CP4755) and are screened separating the fraction with a diameter ranging from 1 to 1.5 mm.

This fraction proved to represent 40%, 30% being the fraction between 0.5 and 1 mm, 15% the fraction between 0.2 and 0.5 mm, and 15% the gross fraction, between 1.5 and 3 mm.

0.2% of glyceryl monostearate and 0.1% of zinc stearate are then added to the fraction of 1 to 1.5 mm.

The product is pre-expanded with vapour at a temperature of 100° C., at two densities, i.e. 14 and 17 g/l, left to age for 1 day and used for the moulding of blocks (having dimensions of 1040×1030×550 mm) The diameter of the cells of beads expanded at 17 g/l was 120-130 microns.

The blocks were then cut to prepare flat sheets on which the thermal conductivity and compression stress at 10% of deformation are measured. The thermal conductivity, measured after 5 days of residence in an oven at 70° C., was 36.5 mW/mK at 14 g/l and 34 mW/mK at 17 g/l. The compression stress at 10% of deformation, measured at 14 g/l was 75 KPa. Test-samples were taken from a sheet for the fire behaviour test according to the regulation DIN 4102. The test-samples passed the test.

EXAMPLE 2

Example 1 is repeated but increasing the Waxo wax to 0.01 parts. The thermal conductivity and all the other characteristics, including the fire behaviour test, remained unvaried.

COMPARATIVE EXAMPLE 1

Example 1 was repeated, but substituting the Waxo wax with 0.002 parts of polyethylene wax having a low molecular weight (<5,000 g/mol) and a melting point of 113° C. The thermal conductivity proved to be comparable to that of Example 1 (37 mW/mk at 14 g/l) as also the fire behaviour test (passed). The compression stress at 10% of deformation, measured at 14 g/l proved to be lower (60 KPa), the cell diameter of the expanded beads was in fact 220-230 microns.

COMPARATIVE EXAMPLE 2

Example 1 was repeated, but without the addition of hexabromocyclododecane. The expandable polymer beads thus produced were then recovered and subjected to the same processing as Example 1. The thermal conductivity proved to be 41 mW/mk at 14 g/l. The compression stress at 10% of deformation, measured at 14 g/l proved to be 80 KPa—the cell diameter of the expanded beads was 90-100 microns. Test samples were taken from a sheet for the fire behaviour test according to the regulation DIN 4102: the test samples did not pass the test.

The invention claimed is:

1. A process for preparing a bead of a flame-retardant expandable vinyl aromatic polymer, the process comprising:
   polymerizing a vinyl aromatic monomer in aqueous suspension, and
   adding an expanding agent before, during, or after the polymerizing,
   wherein the process is carried out with a system consisting of water the vinyl aromatic monomer, a peroxide initiator, an amide, a flame-retardant, and optionally the expanding agent;
   wherein the amide has formula (I):

$$R_1CONHCH_2\text{—}CH_2NHCOR_2 \qquad (I);$$

wherein $R_1$ and $R_2$ are each independently an (iso)alkyl radical $CH_3(CH_2)_n$, a $C_6$-$C_{12}$ aromatic radical, or a $C_7$-$C_{25}$ alkylaromatic radical; if either or both of $R_1$ and $R_2$ is an (iso)alkyl radical $CH_3(CH_2)_n$, each n is independently from 10 to 20;
   wherein the flame-retardant is a brominated additive optionally with a synergic agent comprising a C—C or C—O—O—C thermolabile bond, wherein the brominated additive has a bromine content higher than 30% by weight;
   wherein the bead is capable of producing an expanded article with a reduced thermal conductivity; and
   wherein the peroxide initiator is active at a temperature higher than 80° C.

2. The process of claim 1, wherein a content of the amide is 5 to 5,000 ppm, with respect to a weight of the vinyl aromatic monomer.

3. The process of claim 1, wherein the amide is N,N'-ethylene-bis-stearamide.

4. The process of claim 1, wherein the expanding agent is at least one expanding agent selected from the group consisting of an aliphatic or cyclo-aliphatic hydrocarbon having from 3 to 6 carbon atoms; a halogenated derivative of an aliphatic hydrocarbon having from 1 to 3 carbon atoms; carbon dioxide; and ethyl alcohol.

5. The process of claim 1, wherein a content of the expanding agent is from 1 to 10% by weight, with respect to a weight of the vinyl aromatic monomer.

6. The process of claim 1, wherein the flame-retardant is an aliphatic, cyclo-aliphatic, brominated aromatic compound with a bromine content higher than 30% by weight.

7. The process of claim 1, wherein a content of the flame-retardant is from 0.1 to 3% by weight, with respect to a weight of the vinyl aromatic monomer.

8. The process of claim 1, wherein the flame-retardant is the brominated additive with the synergic agent comprising a C—C or C—O—O—C thermolabile bond.

9. The process of claim 8, wherein a content of the synergic agent is from 0.01% to 1% by weight, with respect to a weight of the vinyl aromatic monomer.

10. The process of claim 1, wherein the vinyl aromatic monomer is styrene or a mixture of styrene comprising up to 25% by weight of α-methylstyrene.

11. The process of claim 1, wherein, in formula (I):
   $R_1$, $R_2$, or both are an (iso)alkyl radical $CH_3(CH_2)_n$, and each n is independently from 16 to 18.

12. The process of claim 1, wherein the bead is capable of producing an expanded article with a density of from 5 to 50 g/L and a thermal conductivity of from 25 to 50 mW/mK.

13. The process of claim 2, wherein the content of the amide is from 10 to 500 ppm, with respect to a weight of the vinyl aromatic monomer.

14. The process of claim 1, wherein the vinyl aromatic monomer comprises a monomer of formula (II):

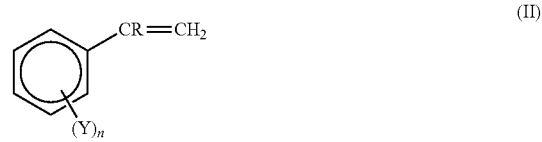

wherein
   R is hydrogen or a methyl group,
   n is an integer of from zero to 5, and
   each Y, if Y is present, is independently a halogen or an alkyl or alkoxyl radical having from 1 to 4 carbon atoms.

15. The process of claim 1, wherein adding the expanding agent is during the polymerizing.

16. A process for preparing a bead of a flame-retardant expandable vinyl aromatic polymer, the process comprising:
   polymerizing a vinyl aromatic monomer in aqueous suspension, and
   adding an expanding agent before, during, or after the polymerizing,
   wherein the process is carried out with a system consisting of water, the vinyl aromatic monomer, a peroxide initiator, an amide, a flame-retardant, and optionally the expanding agent;
   wherein the amide has formula (I):

$$R_1CONHCH_2\text{—}CH_2NHCOR_2 \qquad (I);$$

wherein $R_1$ and $R_2$ are each independently an (iso)alkyl radical $CH_3(CH_2)_n$, a $C_6$-$C_{12}$ aromatic radical, or a $C_7$-$C_{25}$ alkylaromatic radical; if either or both of $R_1$ and $R_2$ is an (iso)alkyl radical $CH_3(CH_2)_n$, each n is independently from 10 to 20;
   wherein the flame-retardant is a brominated additive with a synergic agent comprising a C—C or C—O—O—C thermolabile bond, wherein the brominated additive has a bromine content higher than 30% by weight;
   wherein the bead is capable of producing an expanded article with a reduced thermal conductivity; and
   wherein the peroxide initiator is active at a temperature higher than 80° C.

* * * * *